UNITED STATES PATENT OFFICE.

ARTHUR CHANUTE AND MALVERN W. ILES, OF DENVER, COLORADO.

PROCESS OF ENRICHING LEAD-FUMES.

SPECIFICATION forming part of Letters Patent No. 479,489, dated July 26, 1892.

Application filed March 22, 1892. Serial No. 425,957. (No specimens.)

*To all whom it may concern:*

Be it known that we, ARTHUR CHANUTE and MALVERN W. ILES, of the city of Denver, county of Arapahoe, State of Colorado, have invented a certain new and useful Process of Enriching Lead-Fumes, of which the following is a true and exact description.

Our invention relates to the economical use in argentiferous smelters of the fumes, principally consisting of lead sulphide and sulphate, which are caught and saved by screening the gases, &c., driven off from the reduction-furnaces or blast-furnaces. These fumes are collected in chambers below the bags used as screens and when a proper amount accumulates they are ignited, burning freely, and in burning collecting into solid masses, which are easily handled and of a character suitable for charging into the blast-furnaces. By saving and resmelting these lead-fumes a great saving of lead is effected; but in argentiferous smelting this saving in lead is accompanied by the production of bullion low or rather lower in silver, and it is therefore desirable to bring the bullion to a higher silver value, and this is one of the objects we have in view, another being to provide an economical mode of treatment for the black sulphide of silver ($Ag_2S$) produced by the lixiviation-mills and which as treated heretofore has suffered large losses in silver.

We have discovered that by mixing the sulphide of silver with the collected fumes and then igniting the mixture the burning of the mass will, as in the case of the fumes alone, effect the solidification of the mass in nodules and do so without volatilizing the silver, the temperature of the burning dust not being high enough to do so, and tests showing absolutely no loss in silver. The resulting mixture is not only in good physical condition to be charged to the smelter, but of an excellent chemical composition, the lead sulphate and sulphide being easily reduced to metallic lead and carrying the silver into the bullion.

In practice we prefer to allow, say, from five to ten inches of fume to accumulate in the fume-chambers, then to scatter the black sulphide of silver over the surface, and then to allow more fume to accumulate over the silver, and then to ignite the mass. In practice we have found that the proportion of the sulphide of silver used should be such as will bring the grade of the fume up to from fifty to a hundred ounces of silver to the ton.

Having now described our invention, what we claim as new, and desire to secure by Letters Patent, is—

1. The described process, consisting in screening and saving the metallic fumes and solid particles from lead-reducing furnaces, mixing with said fumes sulphide of silver, and then igniting the fumes to obtain the mixture of lead and silver compounds in a solid state.

2. The described process, consisting in screening and saving the metallic fumes and solid particles from lead-reducing furnaces, spreading sulphide of silver between layers of such fumes, and igniting the fumes to obtain the mixture of lead and silver compounds in a solid state.

3. The described process, consisting in smelting argentiferous lead ores, screening and saving the metallic fumes and solid particles driven off by the furnace, mixing with the fumes thus collected sulphide of silver, igniting the mixture to bring it to a solid condition, and charging the mixture after ignition into the furnaces.

A. CHANUTE.
    MALVERN W. ILES.

Witnesses:
 F. P. McCORMICK,
 C. T. DYE.